United States Patent
Hsu (10) Patent No.: US 8,794,436 B2
(45) Date of Patent: Aug. 5, 2014

(54) PROTECTIVE SHEATH

(76) Inventor: Fu-Yi Hsu, New Taipei (TW)

( * ) Notice: Subject to any disclaimer, the term of this patent is extended or adjusted under 35 U.S.C. 154(b) by 424 days.

(21) Appl. No.: 13/235,528

(22) Filed: Sep. 19, 2011

(65) Prior Publication Data

US 2013/0020215 A1    Jan. 24, 2013

(30) Foreign Application Priority Data

Jul. 22, 2011   (TW) .............................. 100213533 U (51) Int. Cl.
| | | |
|---|---|---|
| *B65D 85/00* | (2006.01) | |
| *F16M 13/00* | (2006.01) | |
| *F16M 11/04* | (2006.01) | |
| *F16M 11/10* | (2006.01) | |
| *A45C 11/00* | (2006.01) | |
| *G06F 1/16* | (2006.01) | |

(52) U.S. Cl.
CPC ............. *F16M 11/041* (2013.01); *F16M 13/00* (2013.01); *A45C 2011/003* (2013.01); *G06F 1/1626* (2013.01); *A45C 2200/15* (2013.01); *F16M 11/10* (2013.01); *G06F 2200/1633* (2013.01)
USPC ........................................................ 206/320

(58) Field of Classification Search
CPC .................................. B65D 85/00; H05K 5/03
USPC ............ 220/23.91, 495.01, 810; 16/226, 273, 16/221; 150/154–168; 206/320, 701
See application file for complete search history.

(56) References Cited

U.S. PATENT DOCUMENTS

| | | | |
|---|---|---|---|
| 5,947,312 A * | 9/1999 | Elstone ........................... 220/1.5 |
| 6,299,011 B1 * | 10/2001 | Rosenfeldt .................... 220/4.29 |
| 6,745,435 B2 * | 6/2004 | Bowers ............................ 16/250 |
| 7,290,310 B2 * | 11/2007 | Yamaguchi ...................... 16/273 |
| 8,191,205 B2 * | 6/2012 | Forrest ............................. 16/273 |
| 2011/0290687 A1 * | 12/2011 | Han ................ 206/320 |
| 2011/0297564 A1 * | 12/2011 | Kim et al. ..................... 206/320 |
| 2012/0037523 A1 * | 2/2012 | Diebel et al. .................. 206/320 |
| 2013/0015195 A1 * | 1/2013 | Hsu ................ 220/810 |

* cited by examiner

*Primary Examiner* — Luan K Bui
*Assistant Examiner* — Rafael Ortiz (57) ABSTRACT

A protective sheath for a portable electronic device having a display surface and a rear surface comprises a front plate for covering the display surface, a holding component for holding the portable electronic device on an inner surface thereof from the rear surface, a position limiting hinge disposed on an outer surface of the holding component, and a support plate is provided. The support plate is pivoted to the outer surface via the position limiting hinge. The front plate connects to the holding component or the support plate and is capable of rotating relative to the holding component or the support plate. When the support plate rotates relative to the holding component for a presetting pivoting angle, the position limiting hinge maintains the presetting pivoting angle between the support plate and the holding component, so as to let the portable electronic device stand on a carrying surface.

12 Claims, 6 Drawing Sheets

PROTECTIVE SHEATH

FIELD OF THE INVENTION

The present invention generally relates to a protective sheath, and more particularly to a protective sheath for a portable electronic device.

DESCRIPTION OF THE RELATED ART

With the development of technology, various portable electronic devices, such as a multimedia player (MP3, MP4 and so on), a cell phone, a personal digital assistant (PDA), a hand-held game console, an electronic book (E-book), a tablet personal computer (tablet PC), a netbook, a notebook and so on, have become an integral part of modern life to many people. To compare with the traditional desk PC, a main advantage of the portable electronic device is easy to get carried. Therefore, in recent years, we can see people operating the portable electronic devices anytime and anywhere.

It should be noted that only some portable electronic devices, such as the netbook, the notebook and some kinds of the hand-held game consoles mentioned above, are generally designed into two foldable bodies respectively disposed with a keyboard and a screen. In such portable electronic devices, the body with the screen can be supported by the body with the keyboard to stand with an adjustable inclination, and thus the devices can be held or put on a table to be watched or operated. In contrast, the other portable electronic devices are generally formed from an integrated design, so that it is necessary to support the devices with additional cradles or other supporting components for standing.

However, the cradles are not always carried with the devices, and a proper supporting component is not readily available. Thus, it is necessary to provide a supporting component with advantages of easily to be carried with the portable electronic device, capable of stably supporting the device to stand on a carrying surface, and capable of adjusting an inclination of the device.

SUMMARY OF THE INVENTION

The present invention is directed to a protective sheath, wherein a portable electronic device held thereon can stably stand on a carrying surface with a presetting tilt angle.

The present invention provides a portable electronic device having a display surface and a rear surface opposite to the display surface, wherein the protective sheath comprises a front plate, a holding component, a position limiting hinge, and a support plate. The front plate may cover the display surface and has a first side edge. The holding component has an inner surface, an outer surface opposite to the inner surface and a second side edge proximal to the front plate, wherein the holding component may hold the portable electronic device on the inner surface from the rear surface. The position limiting hinge is disposed on the outer surface. Besides, the support plate has a third side edge and a fourth side edge opposite to the third side edge, wherein the third side edge is pivoted to the outer surface via the position limiting hinge. The front plate may rotate relative to the holding component due to the first side edge connects with the second side edge, or rotate relative to the support plate due to the first side edge connects with the fourth side edge. When the support plate rotates relative to the holding component for a presetting pivoting angle, the position limiting hinge maintains the presetting pivoting angle between the support plate and the holding component, so as to let the portable electronic device stand on a carrying surface.

According to an embodiment of the present invention, the holding component further has a fifth side edge, a sixth side edge, a seventh side edge and a center region, wherein the fifth side edge is opposite to the second side edge, the sixth side edge connects the second side edge and the fifth side edge, the seventh side edge is opposite to the sixth side edge, and the center region is located among the second side edge, the fifth side edge, the sixth side edge and the seventh side edge. Besides, the position limiting hinge is disposed on the fifth side edge or the center region, or extends from the sixth side edge to the seventh side edge.

According to an embodiment of the present invention, the holding component is a silicon case, a leather case or a plastic case.

According to an embodiment of the present invention, the holding component comprises a rear plate having the inner surface, the outer surface and the second side edge, and a silicon case, a leather case, a plastic case or at least an elastic tape disposed on the inner surface.

According to an embodiment of the present invention, the holding component comprises a rear plate and a plurality of hooks, wherein the rear plate has the inner surface, the outer surface and the second side edge, and the hooks are disposed on at least a part of a periphery of the rear plate excepting the second side edge. In a preferred embodiment, the hooks may further be disposed on at least a part of a periphery of the support plate excepting the third side edge and the fourth side edge.

According to an embodiment of the present invention, the position limiting hinge comprises a first metal sheet, a second metal sheet and at least a shaft, wherein the first metal sheet is fastened to the outer surface, the second metal sheet is fastened to the third side edge, and the shaft is pivoted between where the first metal sheet protruding out of the outer surface and where the second metal sheet proximal to the first metal sheet. In a preferred embodiment, the first metal sheet can be composed of a first main plate, a first folded plate, a second folded plate, at least a first circular folded plate and at least a first connecting plate, wherein the first main plate is disposed on the outer surface, the first folded plate is disposed on the inner surface, the second folded plate passes through the holding component and is connected between the first main plate and the first folded plate, the shaft is fitted into the first circular folded plate, and the first connecting plate is connected between the first main plate and the first circular folded plate. Herein, the holding component can further have a first dent on the outer surface, a second dent on the inner surface and a first slit extending from the inner surface to the outer surface, wherein the first main plate is embedded within the first dent, the first folded plate is embedded within the second dent, and the second folded plate is embedded within the first slit. Moreover, the second metal sheet can be composed of a second main plate, a third folded plate, a fourth folded plate, at least a second circular folded plate and at least a second connecting plate, wherein the second main plate is disposed on a first surface of the support plate facing the rear surface or the outer surface, the third folded plate is disposed on a second surface of the support plate opposite to the first surface, the fourth folded plate passes through the support plate and is connected between the second main plate and the third folded plate, the shaft is fitted into the second circular folded plate, and the second connecting plate is connected between the second main plate and the second circular folded plate. Herein, the support plate can further have a third dent on the first surface, a fourth dent on the second surface and a second slit extending from the first surface to the second surface, wherein the second main plate is embedded within the third dent, the third folded plate is embedded within the fourth dent, and the fourth folded plate is embedded within the second slit. Furthermore, the position limiting hinge can comprise two shafts, the first metal sheet can comprise two first circular folded plates, and the second metal sheet can comprise two second circular folded plates, wherein each of the shafts is fitted into one of the first circular folded plates and a corresponding one of the second circular folded plates. In addition, both of the first circular folded plates can be located between or outside the second circular folded plates. Besides, the shaft can be a combination of a nut and a bolt, the first metal sheet can be fastened to the outer surface by melt bonding, fastening, attaching with adhesive, screwing, riveting or a combination thereof, and the second metal sheet can be fastened to the third side edge by melt bonding, fastening, attaching with adhesive, screwing, riveting or a combination thereof as well.

According to an embodiment of the present invention, the holding component further has an adhesive portion disposed on the inner surface, and the portable electronic device can be held on the inner surface by attaching the adhesive portion to the rear surface.

According to an embodiment of the present invention, the holding component further has a permanent magnet, and the portable electronic device further has another permanent magnet or a ferromagnetic material corresponding to the permanent magnet in position.

According to an embodiment of the present invention, the position limiting hinge is a hinge with a close fit structure or a position limiting structure.

According to an embodiment of the present invention, the position limiting hinge is an embedded hinge.

According to an embodiment of the present invention, the position limiting hinge is an exposed hinge.

Accordingly, when the support plate rotates relative to the holding component for a presetting pivoting angle, the position limiting hinge maintains the presetting pivoting angle between the support plate and the holding component, so as to let the portable electronic device stand on a carrying surface. Therefore, the protective sheath provided in the present invention can not only assist the portable electronic device in standing on a carrying surface, but also maintain an inclination of the portable electronic device stably.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention.

Figure 1:
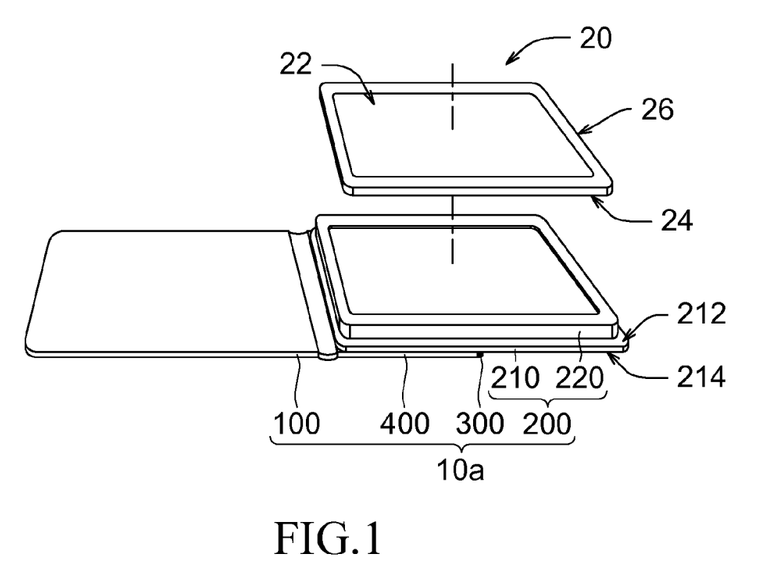
FIG. 1 illustrates a structural perspective view of a protective sheath according to an embodiment of the present invention, wherein a portable electronic device is disassembled therefrom.
Figure 2:
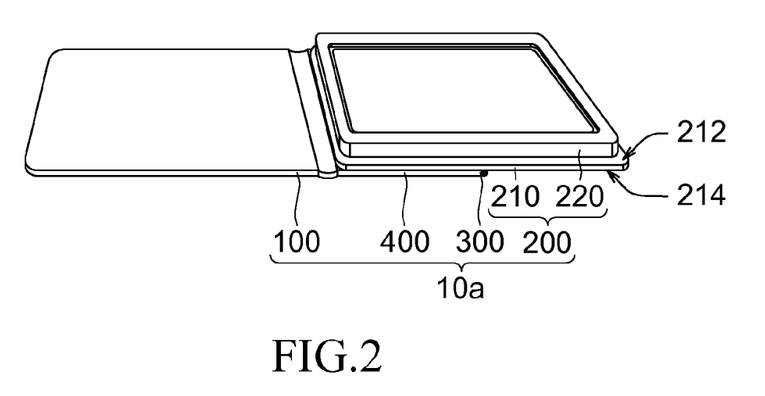
FIG. 2 illustrates a structural perspective view of the protective sheath as illustrated in FIG. 1, wherein the portable electronic device is assembled thereon.
Figure 3:
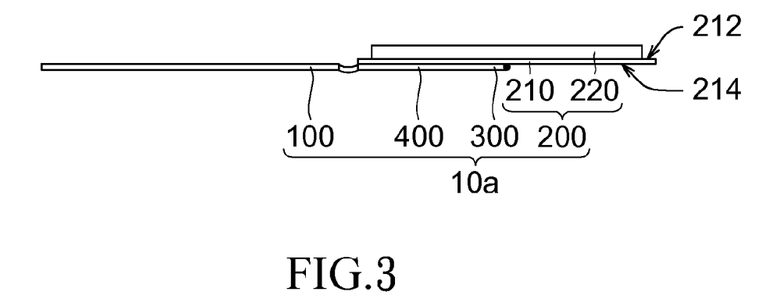
FIG. 3 illustrates a front view of FIG. 2.
Figure 4:
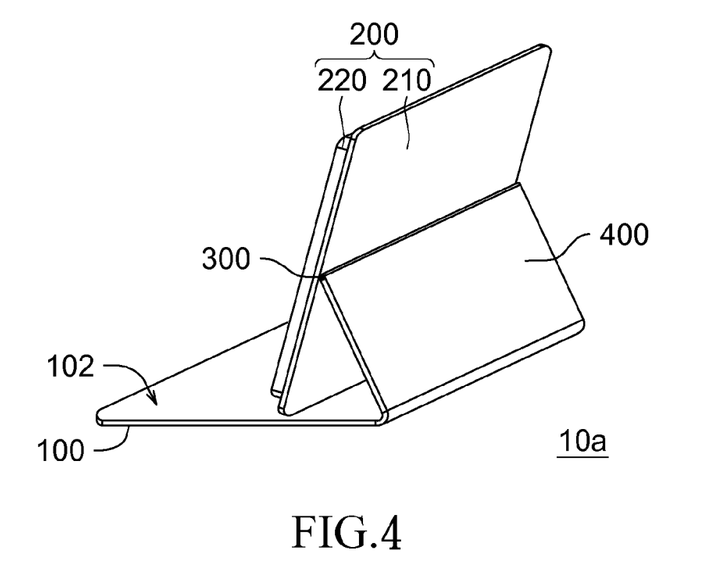
FIG. 4 illustrates a structural perspective view of a usage of the protective sheath as illustrated in FIG. 2, wherein the protective sheath assists the portable electronic device in standing.

FIG. 1 illustrates a structural perspective view of a protective sheath according to an embodiment of the present invention, wherein a portable electronic device is disassembled therefrom, and FIG. 2 illustrates a structural perspective view of the protective sheath as illustrated in FIG. 1, wherein the portable electronic device is assembled thereon. Besides, FIG. 3 illustrates a front view of FIG. 2, and FIG. 4 illustrates a structural perspective view of a usage of the protective sheath as illustrated in FIG. 2, wherein the protective sheath assists the portable electronic device in standing. Referring to FIG. 1 first, the protective sheath 10a of the present invention can use for protecting a portable electronic device 20, wherein the portable electronic device 20 has a display surface 22, a rear surface 24 opposite to the display surface 22 and a side surface 26 connected between the display surface 22 and the rear surface 24. In the present embodiment, the protective sheath 10a as illustrated herein is suitable for a tablet PC. Further, in other non-illustrated embodiments, the protective sheath is suitable for various portable electronic devices with various sizes, such as a PDA, a cell phone or an E-book as well.

Next, referring to FIG. 1, FIG. 2 and FIG. 3, the protective sheath 10a comprises a front plate 100, a holding component 200, a position limiting hinge 300, and a support plate 400. The front plate 100 can cover the display surface 22, while the holding component 200 can hold the portable electronic device 20 from the rear surface 24. The holding component 200 in the present embodiment comprises, for example, a rear plate 210 and a silicon case 220 disposed on an inner surface 212 of the rear plate 210. Therefore, when the holding component 200 holds the portable electronic device 20, the silicon case 220 covers whole of the rear surface 24 and whole of the side surface 26, even covers a part of a periphery of the display surface 22 as well.

Further, in other non-illustrated embodiments, the silicon case can also be replaced by a leather case or a plastic case disposed on the inner surface, wherein the plastic case can be formed integrally or composed of two frames capable of fitting onto the rear surface, the side surface and part of the periphery of the display surface of the portable electronic device from two opposite ends of the portable electronic device respectively. Alternatively, the silicon case can be replaced by at least an elastic tape disposed on the inner surface or a plurality of hooks disposed on at least a part of a periphery of the rear plate for holding different edges or different corners of the portable electronic device. Moreover, the holding component can further have an adhesive portion disposed on the inner surface, and the portable electronic device can be held on the inner surface by attaching the adhesive portion to the rear surface of the portable electronic device. Furthermore, the holding component can further have a permanent magnet, and the portable electronic device can further have another permanent magnet or a ferromagnetic material corresponding to the permanent magnet in position, so as to hold the portable electronic device on the holding component with magnetic force.

In addition, the position limiting hinge 300 is disposed on an outer surface 214 of the rear plate 210, and a right side edge (the upper side, the lower side, the left side and the right side in the present embodiment are defined according to an orientation as illustrated in FIG. 2 for explanation) of the support plate 400 is pivoted to the outer surface 214 via the position limiting hinge 300. Besides, the front plate 100 can be rotated relative to the support plate 400 due to a right side edge of the front plate 100 connects with a left side edge of the support plate 400.

In the present embodiment, the position limiting hinge 300 is an exposed hinge, i.e. the position limiting hinge 300 is exposed between the rear plate 210 and the support plate 400 as illustrated in FIG. 1 to FIG. 4. However, in other non-illustrated embodiments, the position limiting hinge can be an embedded hinge as well, i.e. the position limiting hinge is embedded within the rear plate or the support plate. The position limiting hinge 300 extends from an upper side edge to a lower side edge of the rear plate 210, and can be a hinge with a close fit structure or any other kind of hinges, which are commonly used in existing portable electronic devices and capable of maintaining two bodies at any pivoting angles. Therefore, it is able to clockwise rotate the holding component 200 about the position limiting hinge 300 relative to the support plate 400 till a presetting pivoting angle, and then counterclockwise rotated the holding component 200 and the support plate 400 about the right side edge of the front plate 100 relative to the front plate 100, so as to lean a left side edge of the rear plate 210 on an inner surface 102 of the front plate 100 as illustrated in FIG. 4.

Accordingly, the portable electronic device 20 (illustrated in FIG. 1) is capable of standing on a carrying surface since the position limiting hinge 300 maintains the included angle between the support plate 400 and the holding component 300. In another word, the protective sheath 10a can not only assist the portable electronic device 20 in stably standing on the carrying surface, such as a table, but also stably maintain the inclination of the portable electronic device 20.

It should be noted that the scope of the present invention should not be limited to the above mentioned embodiment. In other non-illustrated embodiments, the position limiting hinge can also be a hinge with a position limiting structure. For example, when the holding component clockwise rotates about the position limiting hinge relative to the support plate till the presetting pivoting angle, a pin or a protrusion of the position limiting hinge is fastened to an inserting aperture or a dent of the position limiting hinge, so as to maintain the included angle between the support plate and the holding component.

Figure 5:
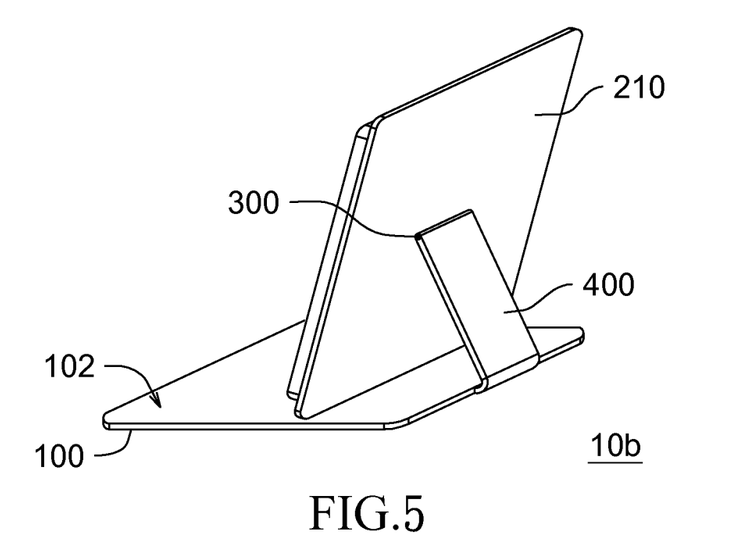
FIG. 5 to FIG. 8 respectively illustrates a structural perspective view of a usage of a protective sheath according to the other embodiments of the present invention, wherein the protective sheath assists the portable electronic device in standing.

FIG. 5 to FIG. 8 respectively illustrates a structural perspective view of a usage of a protective sheath according to the other embodiments of the present invention, wherein the protective sheath assists the portable electronic device in standing. Referring to FIG. 5 first, the structure of the protective sheath 10b in the present embodiment is substantially similar to the structure of the protective sheath 10a as illustrated in FIG. 1 to FIG. 4, besides that the position limiting hinge 300 of the protective sheath 10a extends from the upper side edge of the rear plate 210 to the lower side edge of the rear plate 210, but the position limiting hinge 300 of the protective sheath 10b is disposed on a center region located among the upper side edge, the lower side edge, the left side edge and the right side edge of the rear plate 210, and thus a size of the support plate 400 of the protective sheath 10b is smaller than a size of the support plate 400 of the protective sheath 10a.

Figure 6:
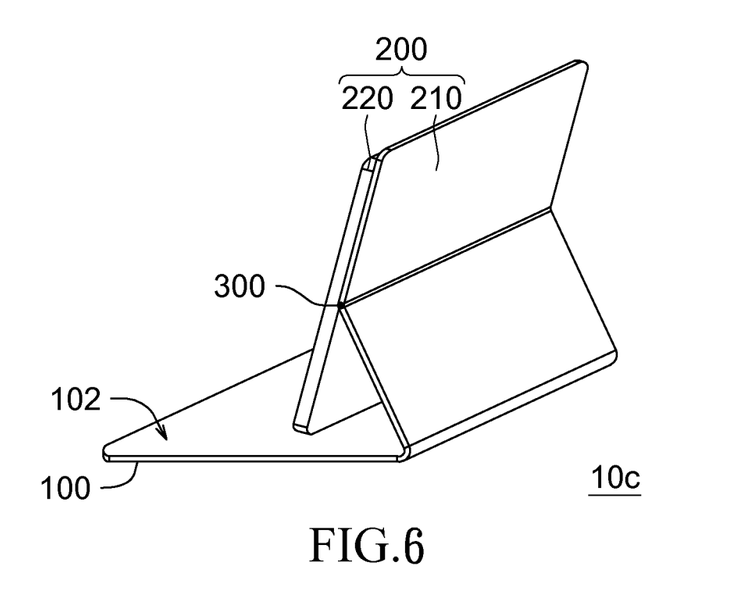

In addition, referring to FIG. 6 hereinafter, the structure of the protective sheath 10c in the present embodiment is substantially similar to the structure of the protective sheath 10a as illustrated in FIG. 1 to FIG. 4, besides a size of the rear plate 210 and an arrangement of the position limiting hinge 300.

In detail, the rear plate 210 of the protective sheath 10a covers whole rear surface of the silicon case 220, and the position limiting hinge 300 extends from the left side edge (the upper side, the lower side, the left side and the right side in following embodiments are defined according to an orientation as illustrated in FIG. 4 to FIG. 9 for explanation) of the rear plate 210 to the right side edge of the rear plate 210. In contrast, the rear plate 210 of the protective sheath 10c covers an upper half part of a rear surface of the silicon case 220 only, and the position limiting hinge 300 is disposed on the lower side edge of the rear plate 210. Therefore, the protective sheath 10a assists the portable electronic device (not shown in FIG. 4) in standing on the carrying surface by leaning the lower side edge of the rear plate 210 on the inner surface 102 of the front plate 100. In contrast, the protective sheath 10c assists the portable electronic device (not shown in FIG. 6) in standing on the carrying surface by leaning the lower side edge of the silicon case 220 on the inner surface 102 of the front plate 100.

Figure 7:
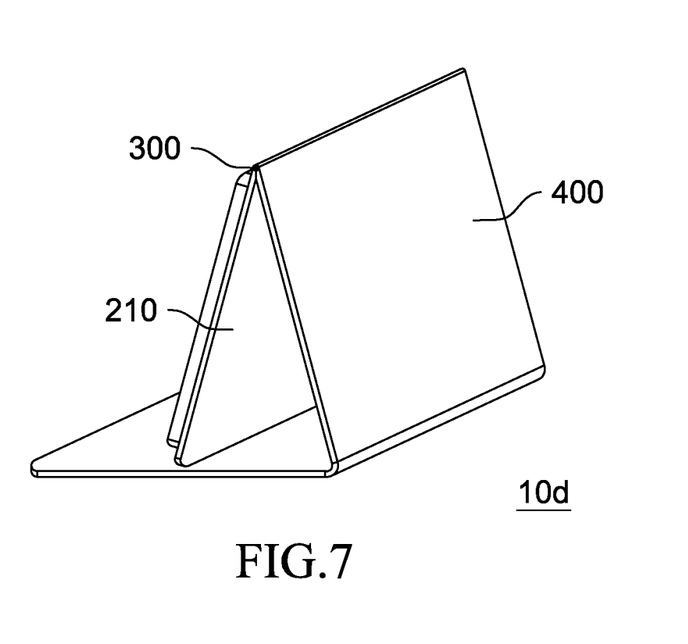

Moreover, referring to FIG. 7 hereinafter, the structure of the protective sheath 10d in the present embodiment is substantially similar to the structure of the protective sheath 10a as illustrated in FIG. 1 to FIG. 4, besides an arrangement of the position limiting hinge 300 and a size of the support plate 400. In a word, the position limiting hinge 300 of the protective sheath 10a is disposed between the upper side edge and the lower side edge of the rear plate 210, while the position limiting hinge 300 of the protective sheath 10d is disposed on the upper side edge of the rear plate 210, and thus the support plate 400 of the protective sheath 10d is larger than the support plate 400 of the protective sheath 10a. In the present embodiment, the sizes of the support plate 400 and the rear plate of the protective sheath 10d are substantially the same Besides, referring to FIG. 8 hereinafter, the structure of the protective sheath 10e in the present embodiment is substantially similar to the structure of the protective sheath 10b as illustrated in FIG. 5, besides that the front plate 100 of the protective sheath 10b can rotate relative to the support plate 400 due to whole of the lower side edge of the support plate 400 connects with a middle part of the right side edge of the front plate 100, while the front plate 100 of the protective sheath 10e can rotate relative to the rear plate 210 due to whole of the left side edge of the front plate 100 connects with whole of the lower side edge of the rear plate 210.

Figure 8:
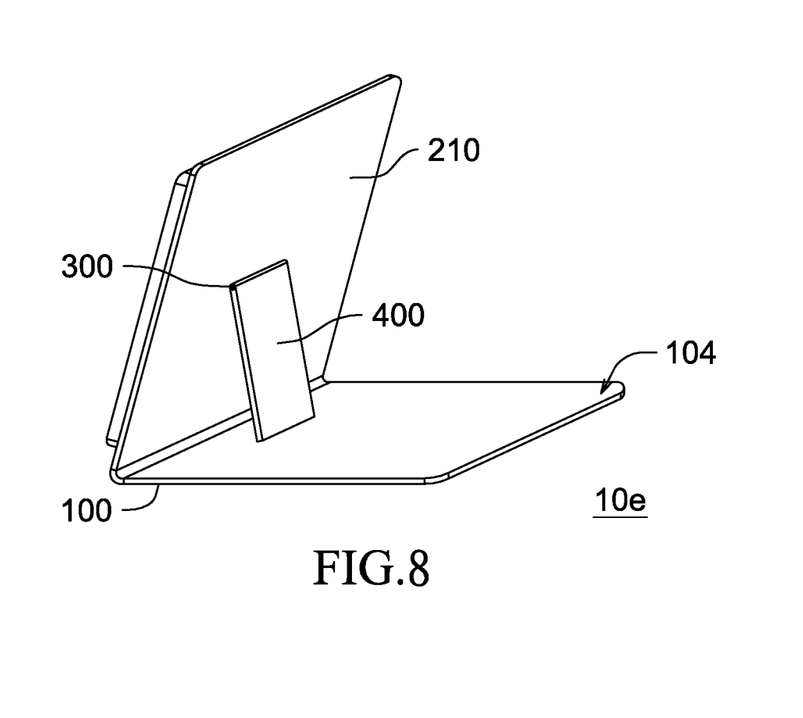

Accordingly, in the protective sheath 10b, the rear plate 210 is clockwise rotated about the position limiting hinge 300 relative to the support plate 400 till the presetting pivoting angle first, and then counterclockwise rotated with the support plate 400 about a right side edge of the front plate 100 relative to the front plate 100, so as to lean the lower side edge of the rear plate 210 on an inner surface 102 of the front plate 100 as illustrated in FIG. 5. In contrast, in the protective sheath 10e, the support plate 400 is counterclockwise rotated about the position limiting hinge 300 relative to the rear plate 210 till the presetting pivoting angle first, and then the front plate 100 is counterclockwise rotated about a lower side edge of the rear plate 210 relative to the rear plate 210, so as to lean the lower side edge of the support plate 400 on an outer surface 104 of the front plate 100 as illustrated in FIG. 8.

Figure 9:
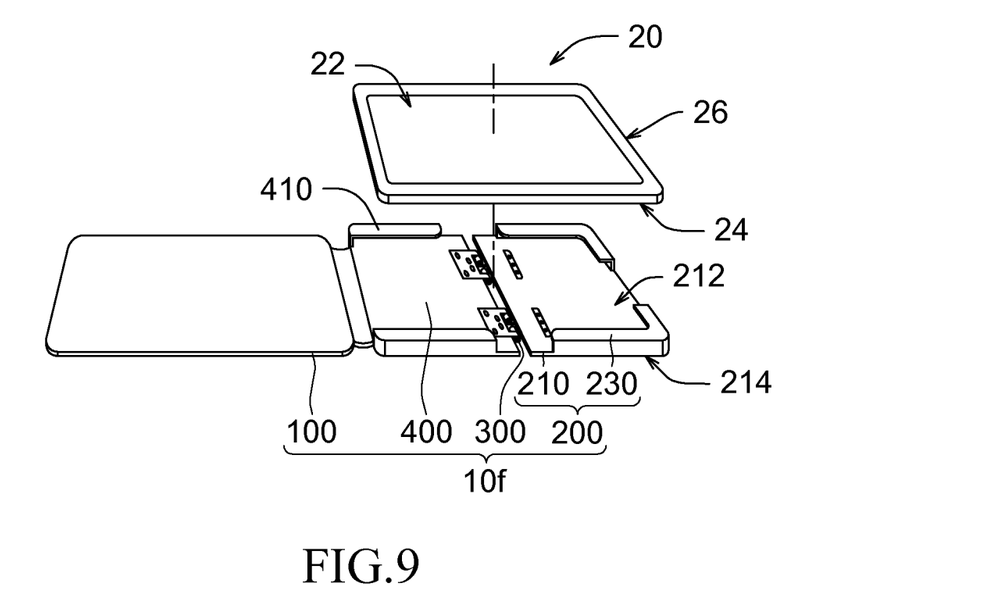
FIG. 9 illustrates a structural perspective view of a protective sheath according to another embodiment of the present invention, wherein a portable electronic device is disassembled therefrom.
Figure 10:
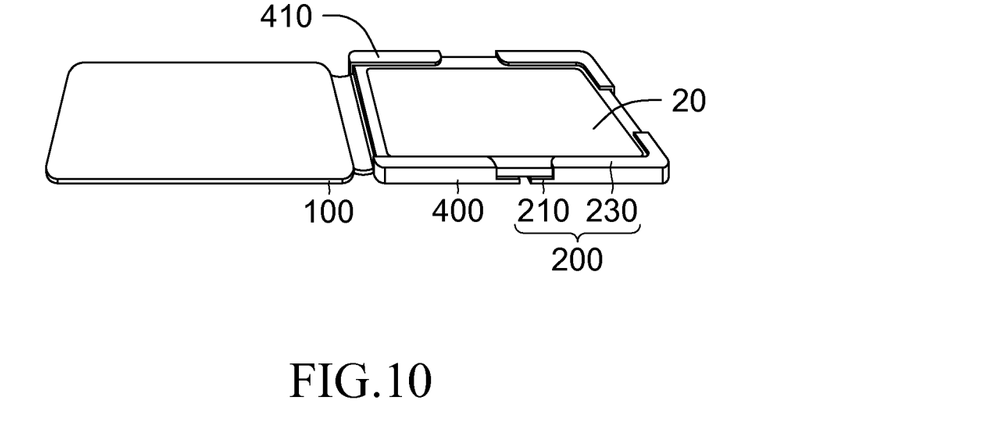
FIG. 10 illustrates a structural perspective view of the protective sheath as illustrated in FIG. 9, wherein the portable electronic device is assembled thereon.
Figure 11:
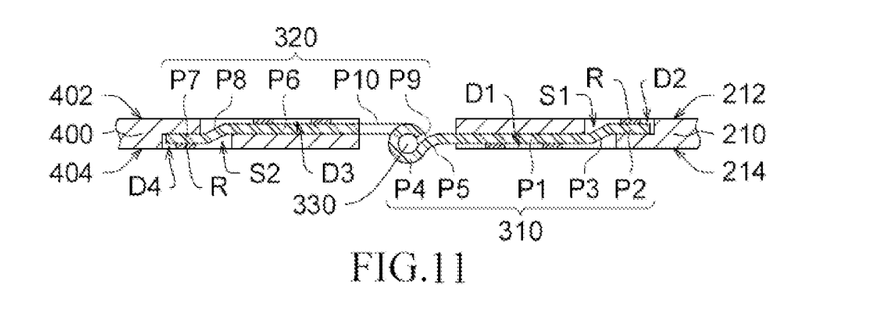
FIG. 11 illustrates a cross-sectional view of a connection of the holding component, the support plate and the hinge with the close fit structure as illustrated in FIG. 9.
Figure 12:
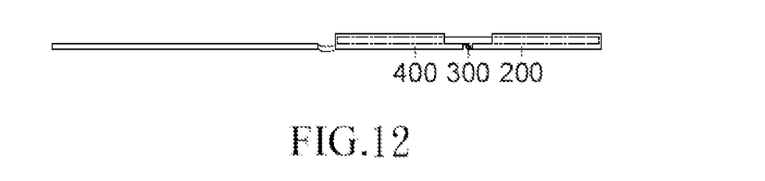
FIG. 12 illustrates a front view of FIG. 10.
Figure 13:
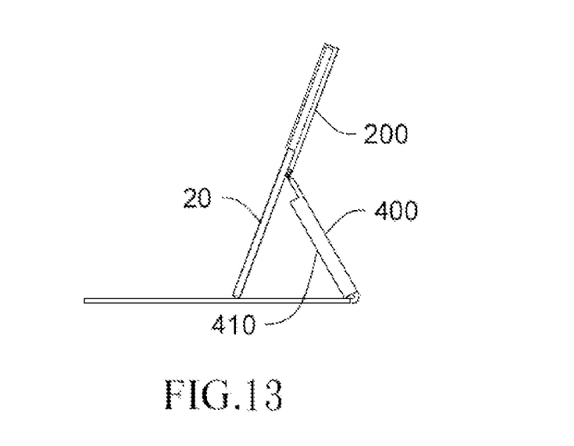
FIG. 13 illustrates a front view of a usage of the protective sheath as illustrated in FIG. 9, wherein the protective sheath assists the portable electronic device in standing.

Furthermore, FIG. 9 illustrates a structural perspective view of a protective sheath according to another embodiment of the present invention, wherein a portable electronic device is disassembled therefrom, and FIG. 10 illustrates a structural perspective view of the protective sheath as illustrated in FIG. 9, wherein the portable electronic device is assembled thereon. Besides, FIG. 11 illustrates a cross-sectional view of a connection of the holding component, the support plate and the hinge with the close fit structure as illustrated in FIG. 9, and FIG. 12 illustrates a front view of FIG. 10. Moreover, FIG. 13 illustrates a front view of a usage of the protective sheath as illustrated in FIG. 9, wherein the protective sheath assists the portable electronic device in standing. Referring to FIG. 9 to FIG. 13, the structure of the protective sheath 10f in the present embodiment is substantially similar to the structure of the protective sheath 10a as illustrated in FIG. 1, besides the detail structure of the holding component 200. Besides, FIG. 9 and FIG. 11 further exemplarily illustrate a detail structure of the position limiting hinge 300 with a close fit structure of the protective sheath 10f in the present embodiment.

In detail, referring to FIG. 9 first, the holding component 200 comprises a rear plate 210 and a plurality of hooks 230, wherein the hooks 230 are disposed on a part of a periphery of the rear plate 210 excepting the side edge adjacent to the support plate 400. In addition, the support plate 400 in the present embodiment also disposed with a plurality of hooks 410 on a part of a periphery of the support plate 400 excepting the side edge adjacent to the rear plate 210 and the front plate 100. Therefore, when the holding component 200 holds the portable electronic device 20 on the inner surface 212 from the rear surface 24, the rear plate 210 and the support plate 400 substantially cover whole of the rear surface 24 together, while the hooks 230 and the hooks 410 covers a part of a part of the side surface 26 and a part of a periphery of the display surface 22 as illustrated in FIG. 10. Besides, the portable electronic device 20 can be departed from the hooks 410 by clockwise rotating the holding component 200 and the portable electronic device 20 to about the position limiting hinge 300 relative to the support plate 400 as illustrated in FIG. 13.

The detail structure of the position limiting hinge is illustrated hereinafter. Referring to FIG. 9 and FIG. 11, the protective sheath 10f in the present embodiment can comprise two position limiting hinges 300 averagely connecting between the rear plate 210 and the support plate 400, and each of the position limiting hinges 300 can comprise a first metal sheet 310, a second metal sheet 320 and at least a shaft 330. In the present embodiment, each position limiting hinge 300 comprises two shafts 330, and each of the shafts 330 is a combination of a nut and a bolt (not shown), so as to form the close fit structure, wherein a tightness provided by the shafts 330 can be adjusted by tightening or releasing the bolts with the nuts. Besides, each of the shafts 330 can provide a torque ranged from 0.4 to 4.6 kgf-cm. In addition, a range of motion of an angle formed between the first metal sheet 310 and the second metal sheet 320 can be ranged from 90 degree to 15 degrees.

The first metal sheet 310 can be fastened to the outer surface 214 by melt bonding, fastening, attaching with adhesive, screwing, riveting or a combination thereof. In addition, the second metal sheet 320 can also be fastened to the right side edge (the upper side, the lower side, the left side and the right side in following embodiments are defined according to an orientation as illustrated in FIG. 9 to FIG. 13 for explanation) of the support plate 400 by melt bonding, fastening, attaching with adhesive, screwing, riveting or a combination thereof. Besides, both of the shafts 330 are pivoted between where the first metal sheet 310 protruding out of the outer surface 214 and where the second metal sheet 320 proximal to the first metal sheet 310.

In detail, the rear plate 210 in the present embodiment can further have a first dent D1 formed on the outer surface 214, a second dent D2 formed on the inner surface 212 and a first slit S1 extending from the inner surface 212 to the outer surface 214. Further, the first metal sheet 310 in the present embodiment comprises a first main plate P1, a first folded plate P2, a second folded plate P3, two first circular folded plates P4 and two first connecting plates P5 (as shown in FIG. 9). The first main plate P1 is embedded within the first dent D1, the first folded plate P2 is embedded within the second dent D2, and the second folded plate P3 is connected between the first main plate P1 and the first folded plate P2 and embedded within the first slit S1, i.e. the second folded plate P3 passes through the rear plate 210. Moreover, the first connecting plates P5 connect between a side edge of the first main plate P1 opposite to the second folded plate P3 and the first circular folded plates P4.

In addition, the support plate 400 in the present embodiment can have an inner surface 402, an outer surface 404 opposite to the inner surface, a third dent D3 formed on the inner surface 402, a fourth dent D4 formed on the outer surface 404 and a second slit S2 extending from the inner surface 402 to the outer surface 404. Besides, the second metal sheet 320 in the present embodiment comprises a second main plate P6, a third folded plate P7, a fourth folded plate P8, two second circular folded plates P9 and two second connecting plates P10 (as shown in FIG. 9). The second main plate P6 is embedded within the third dent D3, the third folded plate P7 is embedded within the fourth dent D4, and the fourth folded plate P8 is connected between the second main plate P6 and the third folded plate P7 and embedded within the second slit S2, i.e. the fourth folded plate P8 passes through the support plate 400. Moreover, the second connecting plates P10 connect between a side edge of the second main plate P6 opposite to the fourth folded plate P8 and the second circular folded plates P9, and are both located outside the first circular folded plates P4 (as illustrated in FIG. 13), and vice versa. Furthermore, each of the shafts 330 is fitted into one of the first circular folded plates P4 and the corresponding one of the second circular folded plates P9. Hence, the holding component 200 and the support plate 400 can be folded (as shown in FIG. 13) and unfolded (as shown in FIG. 12) relative to each other by the position limiting hinges 300.

It should be noted that since the tightness provided by the shaft 330 can be adjusted by tightening the bolt with the nut, the holding component 200 can stably stand on a carrying surface with a support provided by the position limiting hinges 300. Besides, as illustrated in FIG. 11, each of the rear plate 210 and the support plate 400 can also comprise a plurality of enforcing rods R protruding from the bottom surfaces of the first dent D1, the second dent D2 the third dent D3 and the fourth dent D4 and passing through the first main plate P1, the first folded plate P2, the second main plate P6 and the third folded plate P7, so as to tightly fasten the first main plate P1, the first folded plate P2, the second main plate P6 and the third folded plate P7 on the rear plate 210 and the support plate 400 respectively.

In summary, in the present invention, when the support plate rotates relative to the holding component till a presetting pivoting angle, a rotation of the position limiting hinge is restricted by a close fit structure or a position limiting structure of the position limiting hinge, and thus the portable electronic device can stand on a carrying surface due to the presetting pivoting angle between the support plate and the holding component is maintained. Hence, the protective sheath of the present invention can not only assist the portable electronic device in standing on the carrying surface, but also maintain an inclination of the portable electronic device stably.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A protective sheath for a portable electronic device having a display surface and a rear surface opposite to the display surface, wherein the protective sheath comprises:
    a front plate, capable of covering the display surface and having a first side edge;
    a holding component, having an inner surface, an outer surface opposite to the inner surface and a second side edge proximal to the front plate, wherein the holding component is capable of holding the portable electronic device on the inner surface from the rear surface;
    a position limiting hinge, disposed on the outer surface, and comprising:
        a first metal sheet, fastened to the outer surface and comprising:
            a first main plate, disposed on the outer surface;
            a first folded plate, disposed on the inner surface;
            a second folded plate, passing through the holding component and connected between the first main plate and the first folded plate;
            at least a first circular folded plate; and
            at least a first connecting plate, connected between the first main plate and the first circular folded plate;
        a second metal sheet, fastened to the third side edge; and
        at least a shaft, fitted into the first circular folded plate and pivoted between where the first metal sheet protruding out of the outer surface and where the second metal sheet proximal to the first metal sheet; and
    a support plate, having a third side edge and a fourth side edge opposite to the third side edge, wherein the third side edge is pivoted to the outer surface via the position limiting hinge, and the front plate is capable of rotating relative to the support plate due to the first side edge connects with the fourth side edge, when the support plate rotates relative to the holding component for a presetting pivoting angle, the position limiting hinge maintains the presetting pivoting angle between the support plate and the holding component, so as to let the portable electronic device stand on a carrying surface.

2. The protective sheath as claimed in claim 1, wherein the holding component further has a first dent on the outer surface, a second dent on the inner surface and a first slit extending from the inner surface to the outer surface, the first main plate is embedded within the first dent, the first folded plate is embedded within the second dent, and the second folded plate is embedded within the first slit.

3. The protective bag as claimed in claim 1, wherein the second metal sheet comprises:
    a second main plate, disposed on an inner surface of the support plate facing the rear surface;
    a third folded plate, disposed on an outer surface of the support plate opposite to the inner surface of the support plate;
    a fourth folded plate, passing through the support plate and connected between the second main plate and the third folded plate;
    at least a second circular folded plate, wherein the shaft is fitted into the second circular folded plate; and
    at least a second connecting plate, connected between the second main plate and the second circular folded plate.

4. The protective sheath as claimed in claim 3, wherein the support plate further has a third dent on the inner surface of the support plate, a fourth dent on the outer surface of the support plate and a second slit extending from the inner surface to the outer surface of the support plate, the second main plate is embedded within the third dent, the third folded plate is embedded within the fourth dent, and the fourth folded plate is embedded within the second slit.

5. The protective sheath as claimed in claim 1, wherein the position limiting hinge comprises two shafts, the first metal sheet comprises two first circular folded plates, the second metal sheet comprises two second circular folded plates, and each of the shafts is fitted into one of the first circular folded plates and a corresponding one of the second circular folded plates.

6. The protective sheath as claimed in claim 5, wherein both of the first circular folded plates are located between or outside the second circular folded plates.

7. The protective sheath as claimed in claim 1, wherein the shaft is a combination of a nut and a bolt.

8. The protective sheath as claimed in claim 1 wherein the first metal sheet is fastened to the outer surface by melt bonding, fastening, attaching with adhesive, screwing, riveting or a combination thereof.

9. The protective sheath as claimed in claim 1, wherein the second metal sheet is fastened to the third side edge by melt bonding, fastening, attaching with adhesive, screwing, riveting or a combination thereof.

10. The protective sheath as claimed in claim 1, wherein the position limiting hinge is a hinge with a close fit structure or a position limiting structure.

11. The protective sheath as claimed in claim 1, wherein the position limiting hinge is an embedded hinge.

12. The protective sheath as claimed in claim 1, wherein the position limiting hinge is an exposed hinge.

* * * * *